United States Patent Office

3,086,026
Patented Apr. 16, 1963

3,086,026
PRODUCTION OF MALEIC ACID AND MALEIC ANHYDRIDE
Klaus Wiebusch, Ludwigshafen (Rhine), Germany, assignor to Badische Anilin- & Soda-Fabrik Aktiengesellschaft, Ludwigshafen (Rhine), Germany
No Drawing. Filed June 23, 1960, Ser. No. 38,105
Claims priority, application Germany June 27, 1959
2 Claims. (Cl. 260—346.8)

This invention relates to a new catalyst which is especially suitable for the production of maleic acid or its anhydride by oxidation of benzene with oxygen-containing gases in the vapor phase. The invention relates especially to an improved process for the catalytic oxidation of benzene with oxygen-containing gases with the use of a new specially composed catalyst.

It is already known to prepare maleic acid or its anhydride by oxidation of benzene or alkylbenzenes in the gas phase with oxygen or oxygen-containing gases, especially air, and in the presence of catalysts. As catalysts there have already been described a large number of materials of different composition. Almost all of these catalysts contain vanadium and/or molybdenum compounds, especially oxides, as such or in admixture with activating additions, such as zinc, cerium, tungsten, chromium, titanium, boron, zirconium, bismuth, lead and cobalt oxides, or also silver, copper, nickel or phosphorus compounds. Compounds containing alkali and alkaline earth metals have also been co-employed as additives. As carrier substances on which the catalysts have been applied there have served above all quartz, corundum, glass, pumice, asbestos, fullers earth and clay. However, none of the catalysts described in the literature is entirely satisfactory in carrying out industrially the selective oxidation of benzene or alkylbenzenes. Some of the known catalysts permit oxidation only with small throughputs, as for example those of about 10 to 20 grams of benzene per normal cubic meter of air per liter of catalyst, because otherwise the conversion and the life of the catalysts are unsatisfactory. Other catalysts require, to achieve a better conversion at higher throughputs, especially high reaction temperatures, as for example temperatures up to about 500° C., so that it is necessary in such cases, to avoid corrosion damage and side reactions in the reactors, to make these of corrosionproof materials, as for example non-rusting alloy steels.

It is an object of the present invention to provide a process for the production of maleic acid or its anhydride which is free from the disadvantages of the processes hitherto known. Another object of the invention is to render more economical the process of catalytic vapor phase oxidation by the use of a new carrier catalyst applied to a special carrier substance. A further object of the invention consists in the production of a new, specially composed catalyst prepared in a definite way, which has a long life, has a specially selective action in the catalytic vapor phase oxidation of benzene with oxygen-containing gases in a wide temperature range and permits high throughputs of the reactants with high catalyst loading.

I have found that the said objects are achieved by using a catalyst which is obtained by treating titanium dioxide as a carrier with aqueous solutions or suspensions of vanadium complex compounds and phosphomolybdic acid in substance or as the ammonium salt, thickening the resultant mixture to a doughy kneadable paste, shaping the paste without pressure into porous shaped bodies, drying these and activating the catalyst so obtained in a current of air, preferably moist, by heating to a temperature between about 170° and about 400° C.

The technical advance achieved according to this invention resides, inter alia, in the fact that even at relatively low oxidation temperatures below 400° C. and high catalyst loading up to 70 grams of benzene per kilogram of catalyst per hour, there are achieved high conversion and good yields, especially high space-time yields, of maleic acid or its anhydride, without the catalytic activity of the catalyst subsiding even with uninterrupted operation for long periods, for example of about 24 months or longer. The catalysts according to this invention are characterized by substantial insensitivity to temperature and high selectivity. Thus at any oxidation temperature between about 320° and 390° C. it is always possible to achieve good conversions with good yields by adapting the residence periods, i.e., the contact time of the hydrocarbon vapor to be oxidized.

The new catalysts contain as active components $V_2O_5$, $MoO_3$, $P_2O_5$ and $TiO_2$, the titanium dioxide serving as carrier. A crystalline titanium dioxide, especially one of anatase structure, has proved especially suitable. For the preparation of the catalyst, the titanium dioxide is conveniently used in a grain size of about 0.05 to about 1.5 microns, advantageously 0.1 to 0.5 micron, so that the surface of the carrier prior to the shaping lies between about 5 to 20 square meters per gram.

The vanadium is applied to the carrier in the form of water-soluble complex compounds, for example as vanadium (IV) complex salt. Suitable water-soluble complex compounds are for example vanadium (IV) oxalate complex, acidocomplexes of tri- or tetra-valent vanadium with a complexing compound, such as oxalic acid, tartaric acid or other alpha-hydroxycarboxylic acids, especially those of the aliphatic saturated series with 3 to 6 carbon atoms, such as lactic acid, citric acid or malic acid, as well as of mononuclear or dinuclear monohydric or dihydric phenols, which may possibly also contain further substituents, such as formyl or carboxyl groups, for example salicyl aldehyde, pyrocatechol, salicylic acid and hydroxy-naphthoic acid. Vanadium complexes of salicyl aldehyde with ethylene diamine or ortho-phenylene diamine may be used. Instead of starting with the prepared vanadium complex compounds it is also possible to start with the components from which the complex salts form; for example there may be used an aqueous solution of vanadium pentoxide and oxalic acid or other organic carboxylic acids or hydroxycarboxylic acids, such as tartaric acid, salicylic acid, ethylene diamine tetra-acetic acid, possibly with the addition of a reducing agent, or other molecules capable of forming chelates, as for example pyrocatechol, salicyl aldehyde, ethylene diamine, ortho-phenylene diamine, singly or in admixture. When using the units from which the water-soluble vanadium complex salt forms, the vanadium compounds, for example vanadium pentoxide or ammonium vanadates, and the complex forming compounds, for example oxalic acid, are used in about the amounts calculated for the formation of the complex. An excess of the complex forming compounds may however be used, for example up to three times the calculated amount for complex formation.

The molybdenum and the phosphoric acid must be used according to this invention as heteropoly acids in substance, i.e., as already prepared phosphomolybdic acid or its ammonium salt. In this case the units from which the heteropoly acids are formed should not be used.

A solution which may serve for the production of a catalyst according to this invention is obtained for example by introducing into an aqueous solution of oxalic acid, vanadium pentoxide in at least the amount calculated for the formation of the oxalato-complexes and effecting solution, possibly by heating. In this solution there is then dissolved phosphomolybdic acid, or there is suspended the amonium salt of phosphomolybdic acid.

For the preparation of such solutions it is preferable to use as little water as possible, but there must always be sufficient water present for the vanadium complex compound to be dissolved completely. Larger amounts of water than the specified minimum may be used. The amount of water is therefore without limit upwardly because if necessary excess water can be distilled off after or during the impregnation of the titanium dioxide carrier in order that after the impregnation of the carrier there is obtained a dough-like kneadable paste which may be shaped without pressure. The amounts of the vanadium and molybdenum compounds are preferably used for the production of the impregnating solution or suspension in the mol ratio $V_2O_5:MoO_3$ of about 1:1 to 1:8, advantageously 1:3.

On the other hand, if vanadium pentoxide and a molybdenum compound, for example a molybdate, are jointly dissolved in the presence of phosphoric acid in aqueous oxalic acid, this procedure does not lead to useful catalysts even when titanium dioxide is used as carrier. It is only when, in addition to the vanadium complex salt, phosphomolybdic acid for its ammonium salt is used in substance, that it is possible to arrive at the catalysts according to this invention, because only this combination offers a guarantee that the surface of the titanium dioxide carrier will be completely wetted and that, after the shaping, drying and activation, there will be formed on the finished, porous catalyst, a complete coating deposited on the carrier surface in a submicroscopic layer which apparently occasions the excellent special properties of the catalysts or at least is of substantial influence on the special properties of the catalysts according to this invention. As a rule, the coating on the carrier surface is so complete in the finished porous catalyst that individual $V_2O_5$ and $MoO_3$ crystals cannot be detected either by X-ray photography or electron microscopically.

The production of the catalyst may take place for example by introducing titanium dioxide, advantageously in anatase structure, into a complex salt solution of vanadium, containing for example about 5 to 25% by weight of vanadium pentoxide, which besides the vanadium salt complex contains the phosphomolybdic acid dissolved therein in the limits of the mol ratio already stated or the ammonium salt of the heteropoly acid suspended therein. The carrier substance is regulated in its amount so that the proportion of titanium dioxide in the finished catalyst amounts to about 60 to 80, advantageously about 65 to 75% by weight. The impregnation is carried out at a temperature between about 20° and 100° C., advantageously between about 50° and 70° C., with good mixing of the impregnation solution with the carrier. The mixing may be effected by stirring, for example in a stirring container or in a kneader, possibly while evaporating off water, until a doughy mass is present.

When using ammonium salt of phosphomolybdic acid the impregnation and production of the catalyst composition may also be carried out by mixing the titanium dioxide carrier with the ammonium salt dry and then stirring the mixture with a corresponding amount of an aqueous vanadium salt complex solution, preferably of 5 to 25% by weight strength thickening with continuous kneading until a dough-like paste has been formed.

The shaping of the kneadable catalyst paste is advantageously to pills or balls of about 2 to 10 mm., especially those of 4 to 6 mm., diameter or to rod-like structures of about 3 to 10 mm. length and about 2 to 6 mm. diameter. The shaping may take place in the usual way for example by brushing the paste into perforated plates or perforated bands, by extrusion presses or with automatic machines for the pressureless formation of balls. The catalyst particles shaped without pressure must be dried prior to activation. The preferred drying time is dependent on the drying temperature used. For example the drying may be carried out at temperatures between 80° and 200° C. for a period of ½ to 5 hours or more depending on the temperature used. At a temperature of 140° C., for example a drying period of about 1 hour is sufficient. The drying may be carried out in the usual drying ovens, for example hurdle ovens, preferably with circulatory air heating, at atmospheric or reduced pressure, for example 0.1 atmosphere, the shaped catalyst preferably being spread out in not too thick a layer, advantageously in layer thicknesses of about 1 to 10 cm.

Any apparatus which is provided with heating means and an inlet and outlet for gases may be used for the activation of the dried catalyst. It is advantageous for the activation to take place in the reactor which is provided for carrying out the air of benzene to maleic anhydride. It is not necessary to cool the dried catalyst prior to the activation, for example to room temperature. On the contrary the still warm catalyst, for example catalyst still at about 30° to 80° C. or the catalyst available at the drying temperature, may be charged directly into the activation vessel. It is also preferable to spread out the catalyst loosely in layers for the activation. If desired a plurality of layers may be arranged one above the other in the activation vessel, a layer height of about 0.5 to 4 meters, especially one of 2.5 to 3.5 meters, preferably being chosen.

In the activation it is of advantage slowly to raise the temperature to that to which the shaped dried catalyst parts are to be heated, for example by about 3° to 15° C. each hour. The activation may be carried out by allowing air advantageously preheated to about 200° to 360° C. to flow uniformly through a filling of the catalyst, the temperature at the beginning being about 50° to 150° C. and being raised continuously or in stages within about 20 to 100 hours to about 170° to 400° C., especially 300° to 350° C. It is advantageous to add the air current, steam in an amount of up to about 300 grams per normal cubic meter of air, advantageously in an amount of between about 50 and about 150 grams per normal cubic meter of air. For the activation, the air is preferably used in an hourly amount of about 300 to 1500 liters per liter of the dried catalyst. By the coaction of drying with preceding shaping of the catalyst parts without the use of high pressures and then of the activation at high temperatures up to about 400° C., the suitable pore structure of the catalyst is developed. Especially preferred catalysts are those which have an active surface of about 5 to 20 square meters per gram, a mean pore radius of about 200 to 800 A., especially of about 400 to 600 A. Such a catalyst has a liter weight of about 1200 to 1400 grams. The preferred finished catalyst consists of about 60 to 80% by weight of titanium dioxide, about 5 to 30% by weight of $V_2O_5$, about 5 to 30% by weight of $MoO_3$ and about 0.2 to 1.25% by weight of $P_2O_5$.

The oxidation of benzene is carried out in the presence of the catalysts prepared in the foregoing way in the manner usual for the vapor phase oxidation. According to the invention, the oxidation is carried out at temperatures below 400° C., preferably between about 320° and 390° C., especially between about 330° and 360° C., and atmospheric or moderately increased pressures up to about 2 atmospheres absolute. Air comes into consideration mainly as oxidizing agent. It is also possible to work with other oxygen-containing gases, for example those in which oxygen is diluted by inert gases, such as nitrogen or carbon dioxide. Such gas mixtures may have any oxygen content, advantageously about 20% by volume or more, especially 20 to 50% by volume. Gas mixtures with less than 12% by volume of oxygen are less advantageous because then the activity of the catalyst declines.

The catalyst loading may vary within wide limits and is considerably higher as compared with the loading hitherto usual. At catalyst loadings of about 25 to 30 grams of benzene per normal cubic meter of air at a thousandfold catalyst space renewal (catalyst space renewal (CSR)=1 normal liter of air per liter of catalyst per hour) there are achieved yields of 67 to 70% of the theory with almost complete conversion, and even at loadings up to 50 grams of benzene per normal cubic meter of air at a thousandfold catalyst space renewal, the conversion is still more than 95% with yields of about 65 to 70% of the theory.

The following examples will further illustrate this invention but the invention is not restricted to these examples.

*Example 1*

57.5 grams of vanadium pentoxide are dissolved while heating in an aqueous solution of 126 grams of oxalic acid ($C_2O_4H_2.2H_2O$) and 270 grams of water. 170 grams of phosphomolybdic acid $H_3(P(Mo_3O_{10})_4).12H_2O$ are dissolved in the clear blue solution. This solution is mixed with 375 grams of titanium dioxide with a grain size of 0.1 to 1 micron and having anatase structure in a steam-heated kneader and thickened with continuous kneading to a dough-like viscous paste. The paste is brushed into perforated plates and the pills pushed out, after drying at 100° C. for 6 hours in a circulating drying cabinet.

1500 grams of the dried catalyst are charged into a cold saltpetre bath oven of which the reaction tubes have a length of 3.0 meters and a diameter of 25 mm. The oven is heated up and the oven temperature slowly raised to 330° C. within days. At the same time, 700 liters of air per liter of catalyst are charged per hour over the catalyst, and when an oven temperature of 150° C. has been reached 100 grams of steam are added to each cubic meter (NTP) of the air. After 4 days the activation is completed. The finished catalyst contains 10.08% by weight of $V_2O_5$, 24.6% by weight of $MoO_3$, 1.02% by weight of $P_2O_5$ and 64.2% by weight of $TiO_2$. The bulk density is 1050 grams per liter. The catalyst is then heated up, in the same oven in which the activation has been carried out, to 380° C. and loaded with 30 grams of benzene per normal cubic meter of air. At a thousand-fold catalyst space renewal (CSR: normal liters of air per liter of catalyst per hour) 67% of the theory of maleic anhydride are obtained. Even after six months uninterrupted operation, the catalyst still gives the same yields at the same loadings. The conversion is constant at 98% of the theory throughout the whole of the period of time.

*Example 2*

106 grams of $NH_4VO_3$ and 205 grams of oxalic acid (anhydrous) are dissolved in water while heating to 50° C. To this solution there are added 243 grams of phosphomolybdic acid ($H_3(P(Mo_3A_{10})_4).12H_2O_7$. The common solution is thickened to a viscous paste with 863 grams of $TiO_2$ of anatase structure and a mean particle size of 0.1 to 0.5 micron in a steam-heated kneader and shaped, dried and activated as described in Example 1. The finished catalyst contains 7.1% by weight of $V_2O_5$, 17.7% by weight of $MoO_3$, 0.7% by weight of $P_2O_5$ and 74% by weight of $TiO_2$.

When using this catalyst for the vapor phase oxidation of benzene with air as oxidizing agent at 390° C. and atmospheric pressure, there is obtained, at a loading of 30 grams of benzene per normal cubic meter of air and a thousandfold catalyst space renewal, a yield of 67.5% of the theory of maleic anhydride.

*Example 3*

15 grams of $V_2O_5$ are dissolved in a solution of 37 grams of oxalic acid in 100 grams of water while heating. To this solution there are added 23.6 grams of phosphomolybdic acid and then 65 grams of titanium dioxide of anatase structure and a mean grain size of 0.5 micron. With constant stirring, this mixture is evaporated at a reduced pressure of 0.25 atmosphere at 65° C. to a kneadable dough-like mass. After brushing the paste into perforated plates these are dried for 2 hours at 140° C. in a circulatory drying cabinet. After ejecting the pills (4 x 4 mm.), the catalyst has a bulk density 1175 of grams per liter. It contains 15% of $V_2O_5$, 20% of $MoO_3$, 0.8% of $P_2O_5$ and 64.2% of $TiO_2$.

The catalytic oven described in Example 1 is filled at 150° C. with the dried catalyst prepared as above. While leading through 1400 liters (NTP) of air per hour, to which 150 grams of water vapor per normal cubic meter have been added, the catalyst is heated up within 36 hours to 350° C. After this activation, the catalyst gives a yield of 69% of the theory of maleic anhydride in the vapor phase oxidation of benzene at 380° C. at a catalyst space renewal (CSR) of 1000 and a loading of 30 grams of benzene per normal cubic meter of air.

*Example 4*

A kneadable paste is prepared as described in Example 1 from 10 grams of $V_2O_5$, 35 grams of oxalic acid, 16.9 grams of phosphomolybdic acid and 75 grams of $TiO_2$ (anatase structure and mean grain size of 0.1 micron) as well as 50 grams of water. The paste is pushed into a perforated plate and dried thus in a grating or hurdle drier for 1 hour at 160° C. After ejecting the pills (5 x 5 mm.) the catalyst has a bulk density of 1250 grams per liter. Its composition is: 10% of $V_2O_5$, 14.3% of $MoO_3$, 0.7% of $P_2O_5$ and 75% of $TiO_2$. The dried catalyst is poured into the reactor described in Example 1 until it is quite full. The dried catalyst is then activated by heating and by leading through an air stream preheated to 350° C. which contains 50 grams of water per normal cubic meter of air. About 400 liters per hour of air (NTP) are used per liter of catalyst. The treatment is carried on for 48 hours.

The activated catalyst gives a yield of maleic anhydride of 68% of the theory in the vapor phase oxidation of benzene with air at 340° C. at a loading of 30 grams of benzene per normal cubic meter of air and a CSR of 1000.

*Example 5*

A solution of 60 grams of water, 5 grams of $V_2O_5$ and 17.3 grams of oxalic acid is prepared. In the solution there are dissolved 35.5 grams of phosphomolybdic acid while stirring and heating to 50° C. Titanium dioxide of anatase structure and a mean grain size of 0.1 micron is introduced in an amount of 65 grams. During kneading, the catalyst mass thickens to a doughy mass which is then shaped without pressure into rods 10 mm. in length and dried in a drying oven at 80° C. and 0.1 atmosphere. For activation, the catalyst is introduced into the oven described in Example 1 until it is entirely filled. Then 600 liters per hour of dry air are led over the catalyst The latter is slowly heated up with an hourly temperature rise of 10° C. until the temperature is about 340° C. It is then activated for another hour at 340° C.

The catalyst is then heated up to 360° C. in the same oven as that in which it has been activated. With a catalyst space renewal of 800 times and a loading of 30 grams of benzene per normal cubic meter of air per hour, maleic anhydride is obtained in a yield of 70% of the theory.

*Example 6*

340 grams of $(NH_4)_3(P(Mo_3O_{10})_4).6H_2O$ and 1552 grams of $TiO_2$ are introduced into a steam-heated kneader and a solution of 286 grams of $NH_4VO_3$ and 1073 grams of oxalic acid added. After thickening to a viscous doughy paste, the mass is shaped and dried as described in Example 1. The dry catalyst contains 10.7% of $V_2O_5$, 14.2% of $MoO_3$, 0.6% of $P_2O_5$, and 74.5% of $TiO_2$. After activation for four days with air containing 100 grams of water per normal cubic meter (700 normal liters per liter of catalyst) there is obtained with this catalyst in the air oxidation of benzene in the vapor phase at a catalyst space renewal (CSR) of 1800 and a loading of 20 grams of benzene per normal cubic meter of air per hour, maleic anhydride in a yield of 69% of the theory. The conversion is 97%. At a loading of 40 grams of benzene per normal cubic meter of air per hour and a catalyst space renewal of 1000, the yield of maleic anhydride is 67% of the theory and the conversion 96%.

*Example 7*

24.0 kilograms of $V_2O_5$ and 83.0 kilograms of oxalic acid (HOOC—COOH.$2H_2O$) are dissolved hot in 215 liters of water and the solution added in a steam-heated kneader to a mixture of 69.1 kilograms of the ammonium salt of phosphomolybdic acid $((NH_4)_3(P(Mo_3O_{10})_4).6H_2O)$ and 156 kilograms of titanium dioxide. The mixture is thickened in the kneader to a viscous paste. The paste is shaped into pills of 5 x 5 mm. diameter without pressure as described in Example 1 and these are dried in an air current at 100° to 110° C. for about 3 hours.

The catalyst is introduced into a saltpetre bath oven of which the reaction tubes are 3.0 meters long and have a diameter of 25 mm. until it is quite full and activated with 700 normal liters of air per liter of catalyst, to which 150 grams of water per normal cubic meter have been added, at a temperature rising within 4 days from 150° to 330° C. as described in Example 1 and then used for the vapor phase oxidation of benzene with air under the conditions set out in the following table. The yields of maleic anhydride obtained are set out in the last column of the table.

The columns of the table have the following significance:

A—grams of benzene per normal cubic meter of their per hour;
B—grams of benzene per kilograms of catalyst per hour;
C—catalyst space renewal (CSR)—normal liters of air per liter of catalyst per hour;
D—oxidation temperature in ° C.;
E—yield of maleic anhydride in percent by weight of the theory;
F—benzene conversion is percent by weight.

| A | B | C | D | E | F |
|---|---|---|---|---|---|
| 40 | 33.2 | 1,500 | 370 | 69.0 | 95-98 |
| 20 | 16.6 | 1,500 | 370 | 69.5 | 95-98 |
| 22.5 | 18.8 | 1,400 | 360 | 69.0 | 95-98 |
| 30 | 25 | 1,000 | 350 | 67.0 | 95-98 |
| 36 | 30 | 1,000 | 355 | 67.5 | 95-98 |
| 40 | 33 | 1,000 | 355 | 68.5 | 95-98 |
| 48 | 40 | 1,000 | 355 | 67.5 | 95-98 |

At the hourly loading of 25 grams of benzene per kilogram of catalyst, the catalyst was used for 24 months in uninterrupted continuous operation on an industrial scale under the conditions set out in the fourth line of the table without it being possible to detect any decline in its catalytic properties, or diminution in the yield or change in the conversion.

*Example 8*

10 parts of $V_2O_5$ are dissolved in an aqueous solution of 25 grams of tartaric and 100 grams of water while heating. Then the solution is made alkaline with ammonia and then added to 28.7 grams of the ammonium salt of phosphomolybdic acid and 64.2 grams of $TiO_2$ of anatase structure and a mean grain size of 0.06 micron in a steam-heated kneader. The mixture is thickened to a doughy paste with constant kneading. The paste is introduced into perforated plates and dried for 4 hours at 160° C. in a drying cabinet. After ejecting the pills of the size 5 x 5 mm., the catalyst has a bulk density of 1350 grams per liter.

The catalyst thus prepared is charged into the reactor described in Example 1 in a layer 2.5 meters in height and activated at 150° C. by leading thereover 1000 liters per hour of air containing 150 grams per hour of steam. During this activation, the reactor temperature is raised in stages of 10° C. per hour until a temperature of 350° C. has been reached. If 1800 liters of air and 68 grams of benzene per hour are charged over the catalyst at the said temperature, maleic anhydride is obtained in a yield of 66.5% of the theory at a conversion of 95% of the theory.

*Example 9*

47.1 grams of vanadyl salicylate, $(NH_4)_2(VO(C_7H_4O_3)_2)+3H_2O$ are dissolved in 200 grams of water. After adding 19.9 grams of phosphomolybdic acid, the solution is thickened in a steam-heated kneader with 75 parts of $TiO_2$ of anatase structure and a mean grain size of 0.5 micron to a kneadable paste. The mass is shaped, dried and activated as described in Example 1. The bulk density of the finished catalyst is 1220 grams per liter. The catalyst gives, in the air oxidation of benzene by the method described in Example 1 at 350° C., CSR 1000 and a loading of 40 grams of benzene per normal cubic meter of air, a yield of 69% of the theory of maleic anhydride.

*Example 10*

121.5 grams of phosphomolybdic acid are added to a solution of 220 grams of vanadyl pyrocatechol $(NH_4)_2(VO(C_6H_4O_2)_2)+C_6H_4(OH)_2+3H_2O$ in 100 grams of water. The common solution is thickened with 431 grams of $TiO_2$ of anatase structure and a mean particle size of 0.1 to 0.5 micron in a steam-heated kneader to a viscous paste and shaped, dried and activated as in Example 1. The finished catalyst contains 7.1% by weight of $V_2O_5$, 17.7% by weight of $MoO_3$, 0.73% by weight of $P_2O_5$ and 74% by weight of $TiO_2$.

When using this catalyst for vapor phase oxidation with air as oxidizing agent at 390° C. and atmospheric pressure, a yield of 67.5% of the theory of maleic anhydride is obtained at a loading of 30 grams of benzene per normal cubic meter of air and a catalyst space renewal of 1000 times.

What I claim is:

1. In a process for the production of maleic acid and its anhydride by oxidation of benzene with oxygen-containing gases in the vapor phase at temperatures below 400° C. in the presence of a carrier catalyst, the improvement which comprises using a catalyst which has been obtained by impregnating and mixing as a carrier substance titanium dioxide of antase structure and a mean grain size of 0.05 to 1.5 microns with an aqueous solution of a vanadium complex compound which is formed of a vanadium compound from the group consisting of vanadium pentoxide and ammonium vanadate and a compound from the group consisting of oxalic acid, tartaric acid, pyrocatechol, and salicylic acid, and at least one phosphomolybdenum compound from the group consisting of phosphomolybdic acid and its ammonium salts, thickening the mixture to a dough-like and kneadable mass, forming the mass without pressure into shaped bodies having a diameter of 2 to 10 mm., drying the shaped bodies and then activating them by heating to a temperature between 170° and 400° C. while simultaneously leading thereover about 300 to 1500 liters of air per liter of catalyst per hour, the vanadium compound and the phosphomolybdenum compound being used for the impregnation in amounts such that the mol ratio of $V_2O_5$:$MoO_3$ lies between 1:1 and 1:8 and the finished catalyst comprises about 60 to 80% by weight of $TiO_2$, about 5 to 30% by weight of $V_2O_5$, about 5 to 30% by weight of $MoO_3$ and about 0.2 to 1.25% by weight of $P_2O_5$.

2. In a process for the production of maleic acid and its anhydride by oxidation of benzene with oxygen-containing gases in the vapor phase at temperatures below 400° C. in the presence of a carrier catalyst, the improvement which comprises using a catalyst which has been obtained by impregnating and mixing titanium dioxide of anatase structure and a mean grain size of 0.05 to 1.5 microns as a carrier substance with an aqueous solution of a vanadium complex compound which is composed of a vanadium compound from the group consisting of vanadium pentoxide and ammonium vanadate and a compound from the group consisting of oxalic acid, tartaric acid, pyrocatechol, and salicylic acid, and at least one phosphomolybdenum compound from the group consisting of phosphomolybdic acid and its ammonium salts, thickening the mixture to a dough-like and kneadable mass, shaping the mass without pressure into shaped bodies of 2 to 10 mm. in diameter, drying the shaped bodies and then activating them by heating for at least 20 hours to a temperature between 170° and 400° C. while simultaneously leading thereover about 300 to 1500 liters of air per hour per liter of catalyst to each cubic meter of which up to 300 grams of steam have been added, the vanadium and phosphomolybdenum compounds being used for the impregnation in such an amount that the mol ratio of $V_2O_5:MoO_3$ lies between 1:1 and 1:8 and the finished catalyst comprises about 60 to 80% by weight of $TiO_2$, about 5 to 30% by weight of $V_2O_5$, about 5 to 30% by weight of $MoO_3$ and about 0.2 to 1.25% by weight of $P_2O_5$.

References Cited in the file of this patent

UNITED STATES PATENTS

| | | |
|---|---|---|
| 2,294,130 | Porter | Aug. 25, 1942 |
| 2,605,238 | Krantz | July 29, 1952 |
| 2,625,519 | Hartig | Jan. 13, 1953 |
| 2,773,921 | Rylander et al. | Dec. 11, 1956 |

UNITED STATES PATENT OFFICE
CERTIFICATE OF CORRECTION

Patent No. 3,086,026                            April 16, 1963

Klaus Wiebusch

It is hereby certified that error appears in the above numbered patent requiring correction and that the said Letters Patent should read as corrected below.

Column 5, line 29, after "within" insert -- 4 --; column 7, line 32, for "their" read -- air --.

Signed and sealed this 24th day of December 1963.

(SEAL)
Attest:

ERNEST W. SWIDER                        EDWIN L. REYNOLDS

Attesting Officer                          Acting Commissioner of Patents